(12) United States Patent
Ross et al.

(10) Patent No.: US 8,550,408 B2
(45) Date of Patent: Oct. 8, 2013

(54) DUAL EVOLVED EXPENDABLE LAUNCH VEHICLE (EELV) SECONDARY PAYLOAD ADAPTOR (ESPA) PORT SMALL SATELLITE DESIGN

(75) Inventors: Tamaira Emily Ross, Seattle, WA (US); Greg G. Berg, Vista, CA (US); Ward Steven Spear, Kent, WA (US)

(73) Assignee: The Boeing Company, Chicago, IL (US)

( * ) Notice: Subject to any disclaimer, the term of this patent is extended or adjusted under 35 U.S.C. 154(b) by 221 days.

(21) Appl. No.: 12/873,021

(22) Filed: Aug. 31, 2010

(65) Prior Publication Data
US 2012/0012711 A1    Jan. 19, 2012

Related U.S. Application Data

(60) Provisional application No. 61/365,199, filed on Jul. 16, 2010.

(51) Int. Cl.
*B64G 1/10* (2006.01)

(52) U.S. Cl.
USPC ............... 244/173.1; 244/173.3; 244/159.4

(58) Field of Classification Search
USPC .......... 244/158.1, 159.4, 172.4, 173.1, 173.3
See application file for complete search history.

(56) References Cited

U.S. PATENT DOCUMENTS

| | | | |
|---|---|---|---|
| 4,334,816 A | 6/1982 | Slysh | |
| 4,579,302 A | 4/1986 | Schneider et al. | |
| 4,715,566 A | 12/1987 | Nobles | |
| 4,854,526 A | 8/1989 | Rochefort | |
| 5,052,640 A | 10/1991 | Chang | |
| 6,220,548 B1 * | 4/2001 | Hyman | 244/172.6 |
| 6,491,256 B1 | 12/2002 | Wingo | |
| 2005/0248491 A1 * | 11/2005 | Leyre et al. | 343/702 |
| 2008/0149777 A1 * | 6/2008 | Benedict et al. | 244/158.1 |

FOREIGN PATENT DOCUMENTS

| | | |
|---|---|---|
| EP | 0888967 A1 | 1/1999 |
| EP | 1559649 A1 | 8/2005 |
| FR | 2805245 A1 | 8/2001 |
| FR | 2839949 A1 | 11/2003 |
| WO | WO2004/012995 A1 | 2/2004 |

OTHER PUBLICATIONS

Extended European Search Report, Patent Application Ser. No. 11171442.4-2422, Oct. 20, 2011.

* cited by examiner

*Primary Examiner* — Timothy D Collins
*Assistant Examiner* — Nicholas McFall
(74) *Attorney, Agent, or Firm* — Vista IP Law Group LLP; Cynthia A. Dixon

(57) ABSTRACT

An apparatus and method are disclosed for dual Evolved Expendable Launch Vehicle (EELV) Secondary Payload Adapter (ESPA) port small satellite designs. The apparatus and method provide payload volume for larger satellites. In one or more embodiments, the apparatus and method include a plurality of small satellite components, a payload adaptor ring, and at least one pivoting hinge system. In at least one embodiment, the plurality of small satellite components includes at least one payload, one bus, and/or one solar panel. The small satellite components are mounted on the payload adaptor ring. At least one pivoting hinge system connects together at least two of the small satellite components. Upon deployment of the small satellite components from the payload adaptor ring, at least one pivoting hinge system combines together at least two small satellite components, thereby creating at least one single larger satellite.

24 Claims, 4 Drawing Sheets

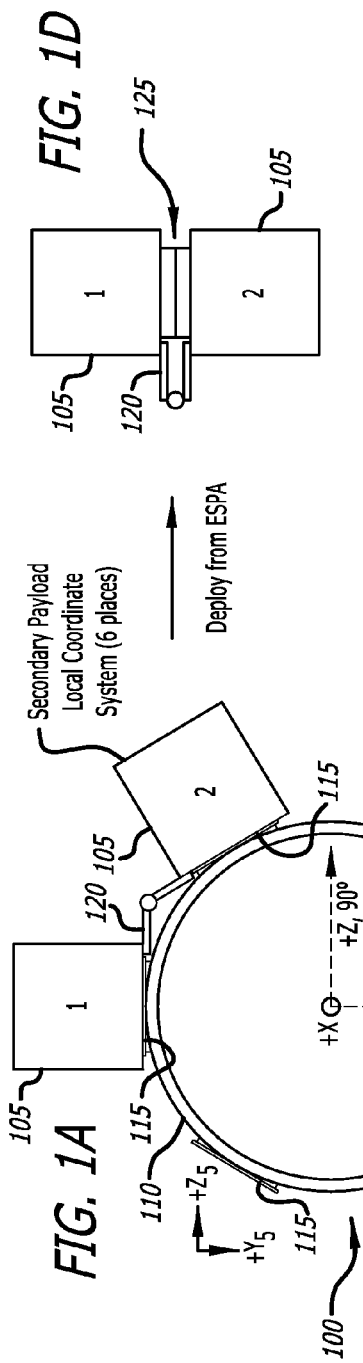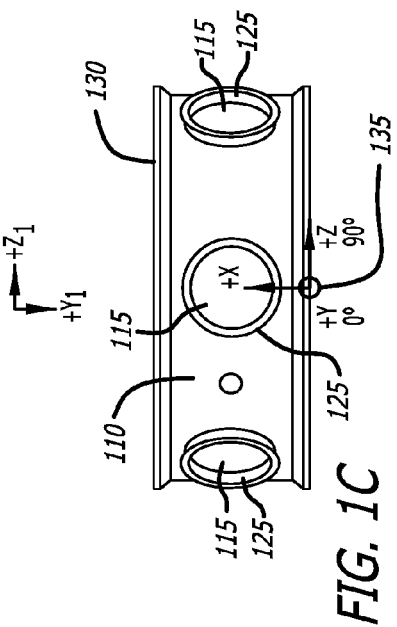

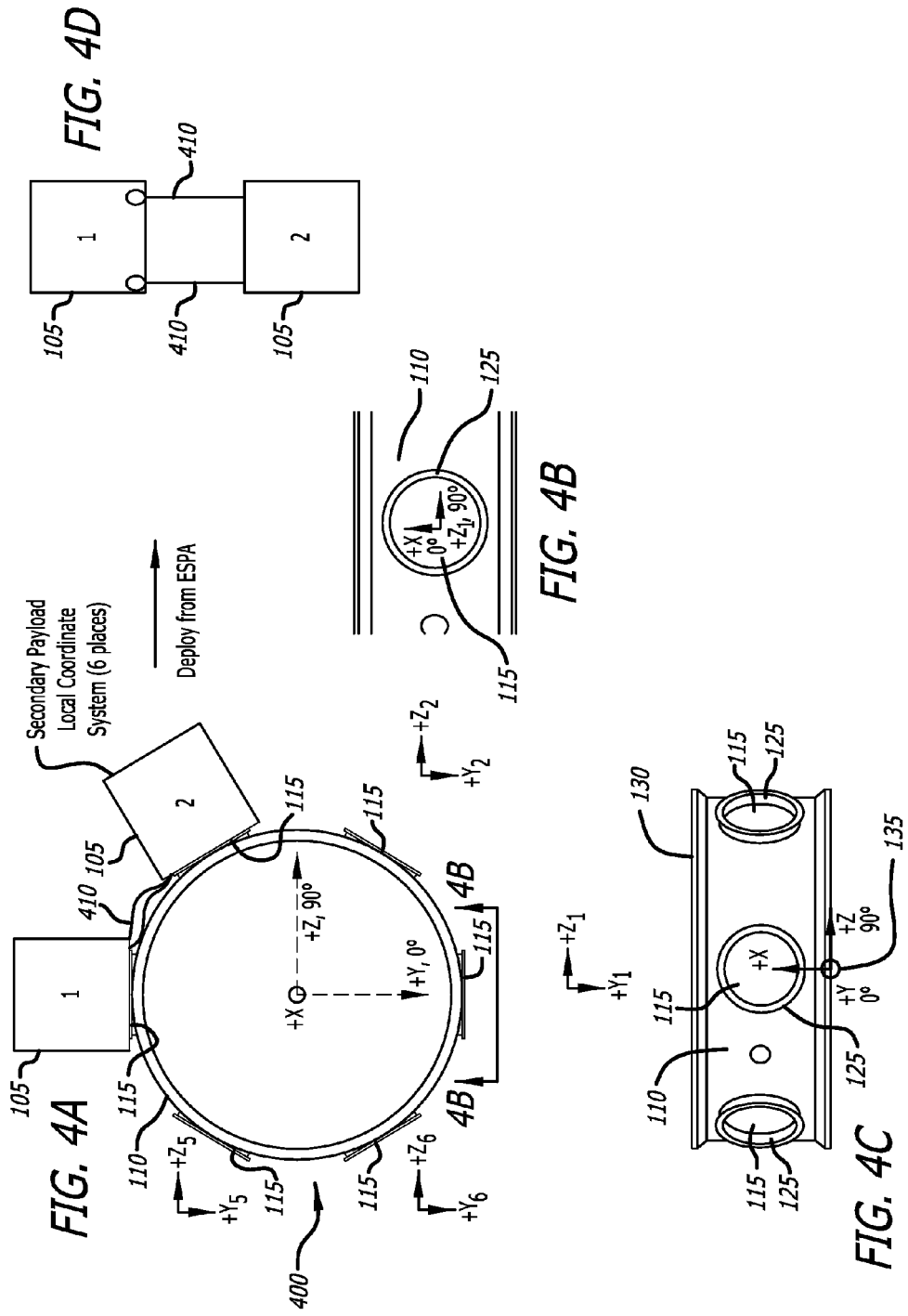

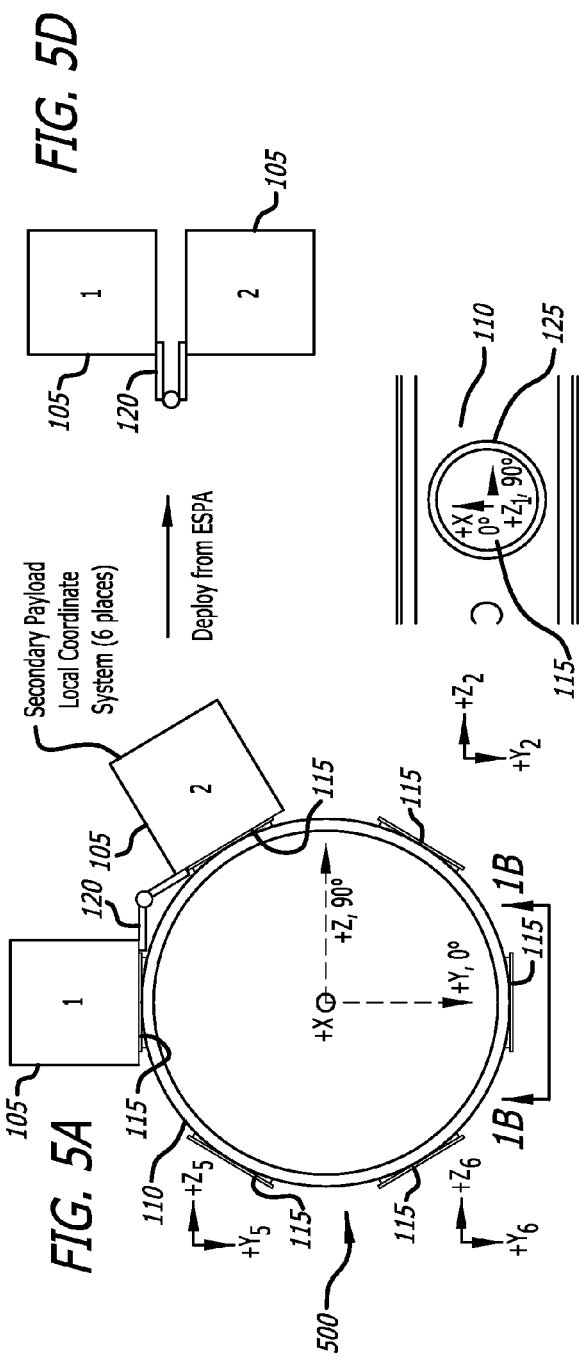
FIG. 5A
FIG. 5B
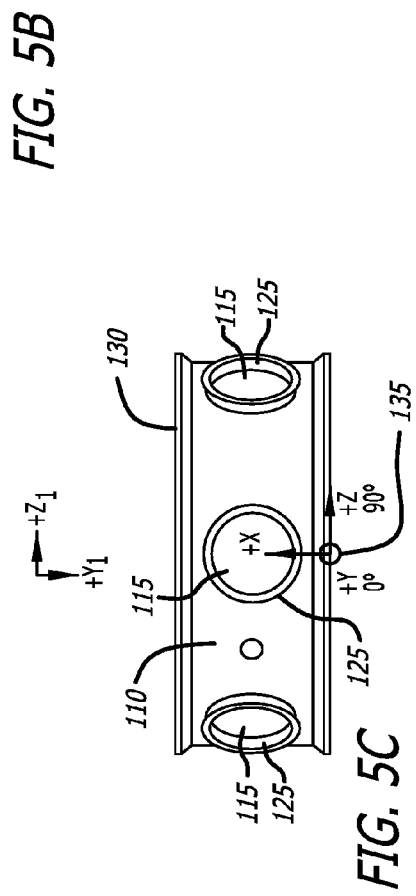
FIG. 5C
FIG. 5D

DUAL EVOLVED EXPENDABLE LAUNCH VEHICLE (EELV) SECONDARY PAYLOAD ADAPTOR (ESPA) PORT SMALL SATELLITE DESIGN

RELATED APPLICATION

This application claims the benefit of and priority to U.S. Provisional Application Ser. No. 61/365,199, filed Jul. 16, 2010, the contents of which are incorporated by reference herein in its entirety.

BACKGROUND

The present disclosure relates to small satellite designs. In particular, it relates to dual Evolved Expendable Launch Vehicle (EELV) Secondary Payload Adapter (ESPA) port small satellite designs.

SUMMARY

The present disclosure relates to an apparatus, method, and system for dual ESPA port small satellite designs. The apparatus, method, and system provide payload volume for larger satellites. In one or more embodiments, the apparatus for dual ESPA port small satellite design involves a plurality of small satellite components, a payload adaptor ring, and at least one pivoting hinge system. In at least one embodiment, the small satellite components are mounted on the payload adapter ring. In addition, at least one pivoting hinge system connects together at least two of the small satellite components. Upon deployment of the small satellite components from the payload adapter ring, at least one pivoting hinge system combines together at least two small satellite components, thereby creating at least one single larger satellite.

In one or more embodiments, the plurality of small satellite components includes at least one payload, at least one bus, and/or at least one solar panel. In some embodiments, the payload adaptor ring comprises at least two payload ports. Each of the small satellite components is mounted to one payload port of the payload adaptor ring.

In some embodiments, the apparatus further comprises at least one mechanical clamp band. One-half of each mechanical clamp band is mounted to the payload adaptor ring and the other half of the mechanical clamp band is mounted to one small satellite component. Each mechanical clamp band provides an interface for two small satellite components that are combined together. The mechanical clamp band is able to couple and uncouple repeatedly the interface of the two small satellite components.

In at least one embodiment, the apparatus further comprises at least one flexible electrical cable. The flexible electrical cable is connected to at least two small satellite components, and allows for electrical connections and/or for communication between the small satellite components to which it is connected. In other embodiments, the apparatus further comprises a means for local wireless communication between at least two small satellite components.

In alternative embodiments, the apparatus for dual ESPA port small satellite design involves a plurality of small satellite components, a payload adaptor ring, and at least one cable and reel system. In some embodiments, the small satellite components are mounted on the payload adapter ring. In addition, at least one cable and reel system connects together at least two of the small satellite components. Upon deployment of the small satellite components from the payload adapter ring, at least one cable and reel system combines together at least two small satellite components and, thus, creates at least one single larger satellite.

In one or more embodiments, the method for dual ESPA port small satellite design involves providing a plurality of small satellite components, and providing a payload adaptor ring. The method further involves mounting the small satellite components on the payload adapter ring. In addition, the method involves providing at least one pivoting hinge system, and connecting together with at least one pivoting hinge system at least two of the small satellite components. The method also involves, upon deployment of the small satellite components from the payload adapter ring, combining together with at least one pivoting hinge system the at least two small satellite components, thereby creating at least one single larger satellite.

In alternative embodiments, the method for dual ESPA port small satellite design involves providing a plurality of small satellite components and a payload adaptor ring. The method also involves mounting the small satellite components on the payload adapter ring. The method further involves providing at least one cable and reel system, and connecting together with at least one cable and reel system at least two of the small satellite components. In addition, the method involves, upon deployment of the small satellite components from the payload adapter ring, combining with at least one cable and reel system at least two small satellite components, which creates at least one single larger satellite.

DRAWINGS

These and other features, aspects, and advantages of the present disclosure will become better understood with regard to the following description, appended claims, and accompanying drawings where:

FIG. 1A illustrates a top view of the apparatus for the dual ESPA port small satellite design that utilizes a pivoting hinge system and a mechanical clamp band, in accordance with at least one embodiment of the present disclosure.

FIG. 1B depicts a view of one payload port of the payload adaptor ring of the apparatus for the dual ESPA port small satellite design of FIG. 1A, in accordance with at least one embodiment of the present disclosure.

FIG. 1C shows a side view of the payload adaptor ring of the apparatus for the dual ESPA port small satellite design of FIG. 1A, in accordance with at least one embodiment of the present disclosure.

FIG. 1D illustrates the two small satellite components of FIG. 1A that are combined together via the pivoting hinge system and are interfaced via the mechanical clamp band, in accordance with at least one embodiment of the present disclosure.

FIG. 4A illustrates a top view of the apparatus for the dual ESPA port small satellite design that utilizes a cable and reel system, in accordance with at least one embodiment of the present disclosure.

FIG. 4B depicts a view of one payload port of the payload adaptor ring of the apparatus for the dual ESPA port small satellite design of FIG. 4A, in accordance with at least one embodiment of the present disclosure.

FIG. 4C shows a side view of the payload adaptor ring of the apparatus for the dual ESPA port small satellite design of FIG. 4A, in accordance with at least one embodiment of the present disclosure.

FIG. 4D illustrates the two small satellite components of FIG. 4A that are combined together via the cable and reel system, in accordance with at least one embodiment of the present disclosure.

FIG. 5A illustrates a top view of the apparatus for the dual ESPA port small satellite design that utilizes a pivoting hinge system, in accordance with at least one embodiment of the present disclosure.

FIG. 5B depicts a view of one payload port of the payload adaptor ring of the apparatus for the dual ESPA port small satellite design of FIG. 5A, in accordance with at least one embodiment of the present disclosure.

FIG. 5C shows a side view of the payload adaptor ring of the apparatus for the dual ESPA port small satellite design of FIG. 5A, in accordance with at least one embodiment of the present disclosure.

FIG. 5D illustrates the two small satellite components of FIG. 5A that are combined together via the pivoting hinge system, in accordance with at least one embodiment of the present disclosure.

DESCRIPTION

Figure 2:
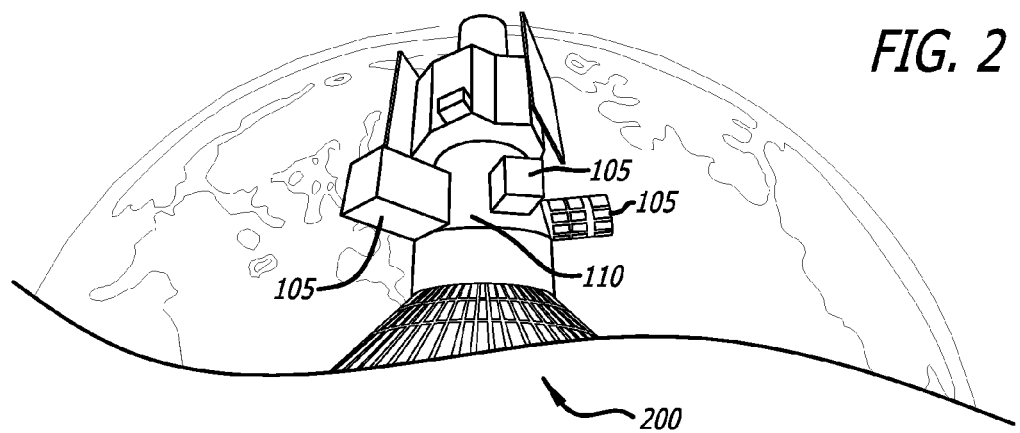
FIG. 2 is a depiction of an Evolved Expendable Launch Vehicle (EELV) with an ESPA ring.

The methods and apparatus disclosed herein provide an operative system for small satellite designs. Specifically, this system relates to dual Evolved Expendable Launch Vehicle (EELV) Secondary Payload Adapter (ESPA) port small satellite designs.

The methods and apparatus of the present disclosure teach a system that allows for a multiple-body small satellite that assembles itself on-orbit via a hinge mechanism and/or a cable and reel mechanism. The disclosed system provides a unique and novel approach to realize desired mission utility for small satellites intended to be launched as secondary, ride-share payloads on Evolved Expendable Launch Vehicle (EELV) Secondary Payload Adapters (ESPAs).

The standard service ESPA single port capability limits the small satellite components to be a constrained 180 kilograms (396.8 pounds) total weight and approximately 0.6096 meters (2 feet)×0.6096 meters (2 feet)×0.9144 meters (3 feet) in volume. These limitations can severely restrict the mission usefulness and life of ESPA-compatible small satellites. The disclosed system employs two or more adjacent ESPA ports to split the spacecraft into multiple small elements that can be reassembled following deployment from the ESPA ring. Another advantage of this disclosed system is that the small elements themselves can be a bus or a payload, thereby allowing for the integration of multiple types of payloads with a common bus for different missions.

Currently, ESPA-class satellites have a very limited ability to support multiple payloads. Some recent designs, such as the Demonstration and Science Experiments (DSX) Satellite and Lunar Crater Observation and Sensing Satellite (LCROSS), use the entire ESPA ring as part of the satellite structure, thereby using the multiple payload ports to attach the various satellite components. For these designs, the mission is performed without the satellite components ever separating from the ESPA ring structure. In these cases, all of the excess launch capacity is dedicated to the mission and, thus, the launch costs cannot be shared by more than one organization. Larger ESPA designs have been proposed by CSA Engineering, which is the manufacturer of the ESPA, to support larger satellites. However, the maximum height of the ESPA ring is dependent on the primary satellite's height within the launch fairing. As such, taller ESPA rings may not be possible for all launches.

The system of the present disclosure addresses the limited mass and volume envelope available for ESPA-compatible small satellites. The volume available to secondary satellites on the ESPA is limited by the radial distance between the ring interface and the inner launch fairing wall. It is also limited by the volume taken by adjacent secondary satellites. The mass of a secondary satellite is limited by the single-port structural capability of the ESPA ring. This disclosed system allows the secondary satellite mass and volume to be distributed over two or more ESPA payload ports. Both of these factors increase the final mission capability. By using two or more of the ESPA payload ports, a small satellite is able to have more capability than a satellite that only attaches to one payload port.

In particular, in one or more embodiments, the disclosed system employs a motorized, multi-axis hinge to join together at least two small satellite components to form a single larger satellite. Other currently existing solutions either perform the mission using the ESPA structure itself or simply use an ESPA ring having a greater height. The disclosed system allows other secondary satellites to use the remaining ESPA payload ports. The disclosed system does not fly the whole ESPA ring itself and, therefore, the overall mass of the satellite is less. This allows for more payload and propulsive capability. The system of the present disclosure is able to use the smallest height ESPA ring, which allows for the most flexibility for launching with a variety of primary satellites. However, it should be noted that the disclosed system may employ ESPA rings of various different heights.

FIG. 1A illustrates a top view of the apparatus for the dual ESPA port small satellite design 100 that utilizes a pivoting hinge system 120 and a mechanical clamp band (not shown), in accordance with at least one embodiment of the present disclosure. In this figure, the dual ESPA port small satellite design 100 is shown to include two small satellite components 105, a payload adaptor ring 110, and one pivoting hinge system 120. The small satellite components 105 are mounted on the payload adaptor ring 110. In one or more embodiments, the small satellite components 105 include at least one payload, at least one bus, and/or at least one solar panel.

The payload adaptor ring 110 is depicted in this figure to contain six payload ports 115. In other embodiments, the payload adaptor ring may include a various number of payload ports 115. Each of the small satellite components 105 is specifically mounted to one payload port 115 of the payload adaptor ring 110. The pivoting hinge system 120 connects together the two small satellite components 105. Upon deployment of the small satellite components 105 from the payload adaptor ring 110, the pivoting hinge system 120 combines together the small satellite components 105, thereby creating a single larger satellite (see FIG. 1D).

FIG. 1B depicts a view of one payload port 115 of the payload adaptor ring 110 of the apparatus for the dual ESPA port small satellite design 100 of FIG. 1A, in accordance with at least one embodiment of the present disclosure. In this figure, the payload port 115 is shown to include a mechanical clamp band 125. One half of the mechanical clamp band 125 is mounted to the payload adaptor ring 110, and the other half of the mechanical clamp band 125 is mounted to one small satellite component 105 (not shown).

FIG. 1C shows a side view of the payload adaptor ring 110 of the apparatus for the dual ESPA port small satellite design 100 of FIG. 1A, in accordance with at least one embodiment of the present disclosure. In this figure, three payload ports 115 are shown. Each payload port 115 includes a mechanical clamp band 125. In addition, the top portion of the payload adaptor ring 110 is the ESPA forward end, which is the payload interface. In addition, the primary payload coordinate system 135 is denoted in this figure.

FIG. 1D illustrates the two small satellite components 105 of FIG. 1A that are combined together via the pivoting hinge system 120 and are interfaced via the mechanical clamp band 125, in accordance with at least one embodiment of the present disclosure. In this figure, the mechanical clamp band 125 is shown to provide an interface for the two small satellite components 105. In one or more embodiments, the mechanical clamp 125 band is able to couple and uncouple repeatedly the interface of the two small satellite components 105. In at least one embodiment, the mechanical clamp band 125 provides electrical connections between the small satellite components 105.

In other embodiments, a flexible electrical cable (not shown) is connected to the two small satellite components 105. The flexible electrical cable allows for electrical connections and/or communication between the two small satellite components 105. In some embodiments, a local wireless communication system is used to provide communication between the two small satellite components 105.

FIG. 2 is a depiction of an Evolved Expendable Launch Vehicle (EELV) with an ESPA ring 110. This figure shows the ESPA ring 110 located beneath the primary payload on an Evolved Expendable Launch Vehicle (EELV). A standard ESPA ring 110 has six, 15-inch diameter ports to which secondary satellites 105 are attached. The standard method for attaching these satellites 105 and releasing them is the Lightband Separation System (mechanical clamp band 125), which is made by Planetary Systems Corporation. However, in alternative embodiments, various other types of mechanical clamp bands 125 may be employed for the disclosed system.

Figure 3:
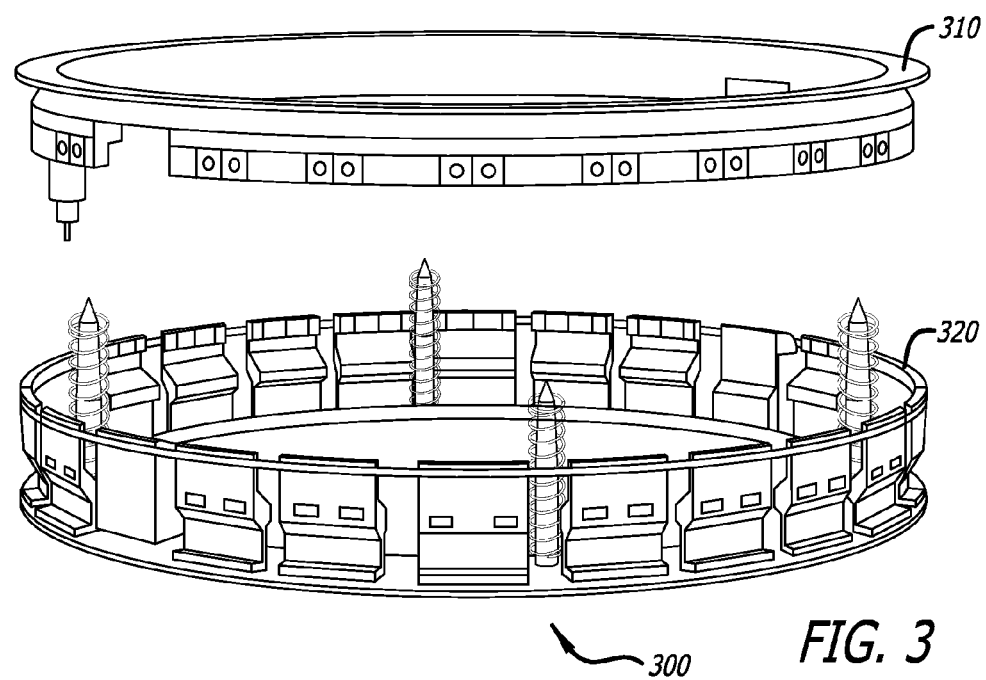
FIG. 3 shows a Lightband Separation System type of mechanical clamp band, which is employed with at least one embodiment of the present disclosure.

FIG. 3 shows a Lightband Separation System 300 type of mechanical clamp band 125, which is employed with at least one embodiment of the present disclosure. In one or more embodiments, each small satellite component 105 has one-half 310 of the Lightband 300 mounted to it. The other opposing half 320 of the Lightband 300 is attached to the ESPA ring 110. When the small satellite components 105 are deployed from the ESPA ring 110, the small satellite components 105 will sequentially separate from each of the payload ports 115. In one or more embodiments, a multi-axis motorized hinge 120 is then used to draw together the small satellite components 105 and to mate them together by interfacing the opposing halves 310, 320 of the Lightband 300. In one or more embodiments, electrical connections and/or communication between the small satellite components 105 are made via a flexible cable that is exterior to the Lightband 300. It should be noted that in alternative embodiments, various different types of mechanical clamp bands 125 other than the Lightband Separation System 300 may be employed by the disclosed system.

FIG. 4A illustrates a top view of the apparatus for the dual ESPA port small satellite design 400 that utilizes a cable and reel system 410, in accordance with at least one embodiment of the present disclosure. The apparatus 400 of this figure is similar to the apparatus 100 of FIG. 1A except that this apparatus 400 employs a cable and reel system 410 instead of a pivoting hinge system 120. The cable and reel system 410 is an alternative system to the pivoting hinge system 120, and serves the same function as the pivoting hinge system 120.

FIG. 4B depicts a view of one payload port 115 of the payload adaptor ring 110 of the apparatus for the dual ESPA port small satellite design 400 of FIG. 4A, in accordance with at least one embodiment of the present disclosure. And, FIG. 4C shows a side view of the payload adaptor ring 110 of the apparatus for the dual ESPA port small satellite design 400 of FIG. 4A, in accordance with at least one embodiment of the present disclosure. FIGS. 4B and 4C are similar to FIGS. 1B and 1C.

FIG. 4D illustrates the two small satellite components 105 of FIG. 4A that are combined together via the cable and reel system 410, in accordance with at least one embodiment of the present disclosure. In one or more embodiments, small satellite component 1 105 uses the cable and reel system 410, which includes a plurality of cables and winches, to reel in small satellite component 2 105.

FIG. 5A illustrates a top view of the apparatus for the dual ESPA port small satellite design 500 that utilizes a pivoting hinge system 120, in accordance with at least one embodiment of the present disclosure. The apparatus 500 of this figure is similar to the apparatus 100 of FIG. 1A except that this apparatus 500 does not employ a mechanical clamp band 125.

FIG. 5B depicts a view of one payload port 115 of the payload adaptor ring 110 of the apparatus for the dual ESPA port small satellite design 500 of FIG. 5A, in accordance with at least one embodiment of the present disclosure. Also, FIG. 5C shows a side view of the payload adaptor ring 110 of the apparatus for the dual ESPA port small satellite design 500 of FIG. 5A, in accordance with at least one embodiment of the present disclosure. FIGS. 5B and 5C are similar to FIGS. 1B and 1C as well as FIGS. 4B and 4C.

FIG. 5D illustrates the two small satellite components 105 of FIG. 5A that are combined together via the pivoting hinge system 120, in accordance with at least one embodiment of the present disclosure. In this figure, the pivoting hinge system 120, without the use of a mechanical clamp band 125, holds the relative position of small satellite component 1 105 to small satellite component 2 105.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

We claim:

1. An apparatus to provide payload volume for larger satellites, the apparatus comprising:
   a plurality of small satellite components;
   a payload adaptor ring, wherein each of the small satellite components is mounted to a respective payload port of the payload adapter ring; and
   at least one pivoting hinge system,
   wherein the at least one pivoting hinge system connects together at least two of the small satellite components,
   wherein upon deployment of the small satellite components from the payload adapter ring, the at least one pivoting hinge system combines together the at least two small satellite components, thereby creating at least one single larger satellite.

2. The apparatus of claim 1, wherein the plurality of small satellite components includes at least one payload.

3. The apparatus of claim 1, wherein the plurality of small satellite components includes at least one bus.

4. The apparatus of claim 1, wherein the plurality of small satellite components includes at least one solar panel.

5. The apparatus of claim 1, wherein the apparatus further comprises at least one mechanical clamp band.

6. The apparatus of claim 5, wherein one half of the at least one mechanical clamp band is mounted to the payload adaptor ring and the other half of the at least one mechanical clamp band is mounted to one small satellite component.

7. The apparatus of claim 5, wherein the at least one mechanical clamp band provides an interface for two small satellite components that are combined together.

8. The apparatus of claim 7, wherein the at least one mechanical clamp band is able to couple and uncouple repeatedly the interface of the two small satellite components.

9. The apparatus of claim 1, wherein the apparatus further comprises at least one flexible electrical cable, wherein the at least one flexible electrical cable is connected to the at least two small satellite components, and wherein the at least one flexible electrical cable allows for electrical connections and for communication between the at least two small satellite components.

10. The apparatus of claim 1, wherein the apparatus further comprises a means for local wireless communication between the at least two small satellite components.

11. An apparatus to provide payload volume for larger satellites, the apparatus comprising:
a plurality of small satellite components;
a payload adaptor ring, wherein each of the small satellite components is mounted to a respective payload port of the payload adapter ring; and
at least one cable and reel system,
wherein the at least one cable and reel system connects together at least two of the small satellite components,
wherein, upon deployment of the small satellite components from the payload adapter ring, the at least one cable and reel system combine together the at least two small satellite components, thereby creating at least one single larger satellite.

12. A method to provide payload volume for larger satellites, the method comprising:
providing a plurality of small satellite components;
providing a payload adaptor ring;
mounting each of the small satellite components to a respective payload port of the payload adapter ring;
providing at least one pivoting hinge system;
connecting together with the at least one pivoting hinge system at least two of the small satellite components; and
wherein, upon deployment of the small satellite components from the payload adapter ring, combining together with the at least one pivoting hinge system the at least two small satellite components, thereby creating at least one single larger satellite.

13. The method of claim 12, wherein the plurality of small satellite components includes at least one payload.

14. The method of claim 12, wherein the plurality of small satellite components includes at least one bus.

15. The method of claim 12, wherein the plurality of small satellite components includes at least one solar panel.

16. The method of claim 12, wherein the method further comprises providing at least one mechanical clamp band.

17. The method of claim 16, wherein one half of the at least one mechanical clamp band is mounted to the payload adaptor ring and the other half of the at least one mechanical clamp band is mounted to one small satellite component.

18. The method of claim 16, wherein the at least one mechanical clamp band provides an interface for two small satellite components that are combined together.

19. The method of claim 18, wherein the at least one mechanical clamp band is able to couple and uncouple repeatedly the interface of the two small satellite components.

20. The method of claim 12, wherein the method further comprises providing at least one flexible electrical cable; and connecting the at least one flexible electrical cable to the at least two small satellite components, wherein the at least one flexible electrical cable allows for electrical connections and for communication between the at least two small satellite components.

21. The method of claim 12, wherein the method further comprises providing a means for local wireless communication between the at least two small satellite components.

22. A method to provide payload volume for larger satellites, the method comprising:
providing a plurality of small satellite components;
providing a payload adaptor ring;
mounting each of the small satellite components to a respective payload port of the payload adapter ring;
providing at least one cable and reel system;
connecting together with the at least one cable and reel system at least two of the small satellite components; and
wherein, upon deployment of the small satellite components from the payload adapter ring, combining together with the at least one cable and reel system the at least two small satellite components, thereby creating at least one single larger satellite.

23. An apparatus to provide payload volume for larger satellites, the apparatus comprising:
a plurality of small satellite components;
a payload adaptor ring, wherein each of the small satellite components is mounted to a respective payload port of the payload adapter ring; and
at least one connecting system to connect together at least two of the small satellite components,
wherein upon deployment of the small satellite components from the payload adapter ring, the at least one connecting system combines together the at least two small satellite components, thereby creating at least one single larger satellite.

24. A method to provide payload volume for larger satellites, the method comprising:
providing a plurality of small satellite components;
providing a payload adaptor ring;
mounting each of the small satellite components to a respective payload port of the payload adapter ring;
providing at least one connecting system;
connecting together with the at least one connecting system at least two of the small satellite components; and
wherein, upon deployment of the small satellite components from the payload adapter ring, combining together with the at least one connecting system the at least two small satellite components, thereby creating at least one single larger satellite.

* * * * *